United States Patent [19]

Jellinek et al.

[11] Patent Number: 5,736,984

[45] Date of Patent: Apr. 7, 1998

[54] METHOD AND SYSTEM FOR EMBEDDED FEEDBACK MESSAGE AND GRAPHICAL PROCESSING ELEMENT

[75] Inventors: Herb Jellinek, Santa Cruz; Steve Byrne, San Jose; Annette Wagner, Mountain View, all of Calif.

[73] Assignee: Sun Microsystems, Inc., Palo Alto, Calif.

[21] Appl. No.: 675,333

[22] Filed: Jul. 3, 1996

[51] Int. Cl.⁶ .................................................. G06F 3/00
[52] U.S. Cl. ................................... 345/338; 345/335
[58] Field of Search ............................... 395/326–358; 434/118

[56] References Cited

U.S. PATENT DOCUMENTS

| 4,648,062 | 3/1987 | Johnson et al. | 395/338 |
| 4,789,962 | 12/1988 | Berry et al. | 395/338 |
| 5,029,113 | 7/1991 | Miyoshi et al. | 395/336 |
| 5,122,972 | 6/1992 | Richards et al. | 395/338 |
| 5,287,448 | 2/1994 | Nicol et al. | 395/338 |
| 5,377,319 | 12/1994 | Kitahara et al. | 395/338 |
| 5,436,637 | 7/1995 | Gayraud et al. | 395/338 |
| 5,513,308 | 4/1996 | Mori | 395/338 |

*Primary Examiner*—John E. Breene
*Attorney, Agent, or Firm*—Leland Z. Wiesner

[57] ABSTRACT

Embodiments of the present invention provide a computer implemented method and apparatus for processing user defined input on a graphical user interface (GUI). Initially, a first user defined input value is received in a first graphical processing element. This first graphical processing element determines if the first user defined input value is a valid input value. Typically, this is done by comparing the first user defined input value with a set of valid input values. The first graphical processing element and said feedback message are embedded in a second graphical processing element. The second graphical processing element receives a feedback message from the first graphical processing element if the first graphical processing element determines that the first user defined input value is invalid. The second graphical processing element displays the feedback message and the first graphical processing element in a GUI when the first user defined input value is invalid. The second graphical processing element uses the first graphical processing element to receive and process a second user defined input value.

18 Claims, 7 Drawing Sheets

METHOD AND SYSTEM FOR EMBEDDED FEEDBACK MESSAGE AND GRAPHICAL PROCESSING ELEMENT

FIELD OF THE INVENTION

The present invention relates generally to graphical user interfaces (GUIs) on computer systems. More specifically, the invention is a method and apparatus to be used on a GUI for displaying and interactively correcting errors which occur during data processing.

BACKGROUND OF THE INVENTION

Many modern data processing applications utilize graphical user interfaces (GUI) to receive and process data. Typically, a user enters data on a keyboard into various input fields displayed by the GUI on their display unit or terminal. Unfortunately, a user can make numerous errors in the data entry process for a variety of reasons. Some errors occur because the user has entered data too quickly on a data input device. Other errors occur when the user does not know what input values the application requires and provides the incorrect response.

On conventional systems, an error message is displayed on the GUI when the processing portion of the GUI determines that an invalid data value has been provided in an input field. A separate error message dialog box with an error message will typically "pop up" within the GUI on the user's display screen. In most cases, this dialog box will cover some, if not all, of the input data entered on the input fields.

The current user interface for providing error messages on a GUI is flawed in several respects. First, current error messaging typically fails to inform a user what specific error has occurred. In most data processing applications, error messages are not specifically tailored for each type of error. A user may receive the same error message for a number of different errors. As a result, the user may spend an inordinate amount of time determining what is wrong with the data values provided.

Current error message techniques are inefficient because they do not provide a method of quickly resolving errors. Error messages on existing systems are static and are not interactive. They typically place a warning on the display screen and do not promote further processing of the data.

Moreover, conventional error message techniques make GUIs hard to use because the dialog boxes cover up critical information. To resolve errors and continue processing data, a user must switch the context of the display between the error messages and the data entry screens. Context switching on conventional GUIs is necessary because the user can not correct the invalid data in the original data entry screens while the error message is being displayed. In some cases, the user may have to memorize critical information provided in the error message when re-entering the data. These additional steps can lead to unnecessary delays and additional errors.

There is a need for an information feedback technique which preserves the context of data processed on the underlying screen and enables the user to interactively correct errors.

SUMMARY OF THE INVENTION

Embodiments of the present invention provide a computer implemented method and apparatus for processing user defined input on a graphical user interface (GUI). Initially, a first user defined input value is received in a first graphical processing element. This first graphical processing element determines if the first user defined input value is a valid input value. Typically, this is done by comparing the first user defined input value with a set of valid input values. The second graphical processing element displays a feedback message and the first graphical processing element in a GUI when the first user defined input value is determined to be invalid. The second graphical processing element uses the first graphical processing element to receive and process data the user re-enters in an attempt to correct the invalid entry.

There are several advantages offered by embodiments of the present invention which were previously unavailable. First, GUI based feedback messages provided according to principles of the present invention are easy to use because the feedback information is collocated with the mechanism for responding to the feedback. Accordingly, an error message provided according to embodiments of the present invention also include a mechanism for correcting the error. On conventional GUIs, the feedback information required to correct an error is usually severed from the area where the new data is re-entered. Existing systems force the user to switch context between the area where the error message appears and the data processing area where the data is re-entered and corrected. Context switching confuses the user and increases the time to process data. In contrast, the error messages provided according to teachings and suggestions of the present invention indicate in a single area what aspect of the data is in error and a novel technique for correcting the error.

Embodiments of the present invention are advantageous because the error messages correspond to specific errors which occur during data processing. In the past, a single error message was used to cover a broad spectrum of errors. Embodiments of the present invention, however, accept error messages tailored to the specific error or problem encountered. This reduces the ambiguity associated with various errors and makes the GUI easier to use.

Embodiments of the present invention are also advantageous because they provide a guideline for resolving the error. On existing systems, error messages indicate an error has occurred but do not indicate how the error can be resolved. Sometimes, the user must also refer to a manual or reference guide for a solution. In contrast, embodiments of the present invention provide a graphical element on the GUI which provides an error message, receives a new user defined input value, and processes the input value for the underlying application. These steps expedite the processing of data.

Embodiments of the present invention also promote rapid development of information feedback systems in software applications. In the past, a new set of error messages required a separate error message routine for displaying the error messages on the GUI. Typically, software developers could not reuse conventional error message routines without significant modifications to the code. In contrast, embodiments of the present invention reuse a generic error message routine to display all error messages on the screen.

NOTATIONS AND NOMENCLATURE

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

Overview of System Environment

Figure 1:
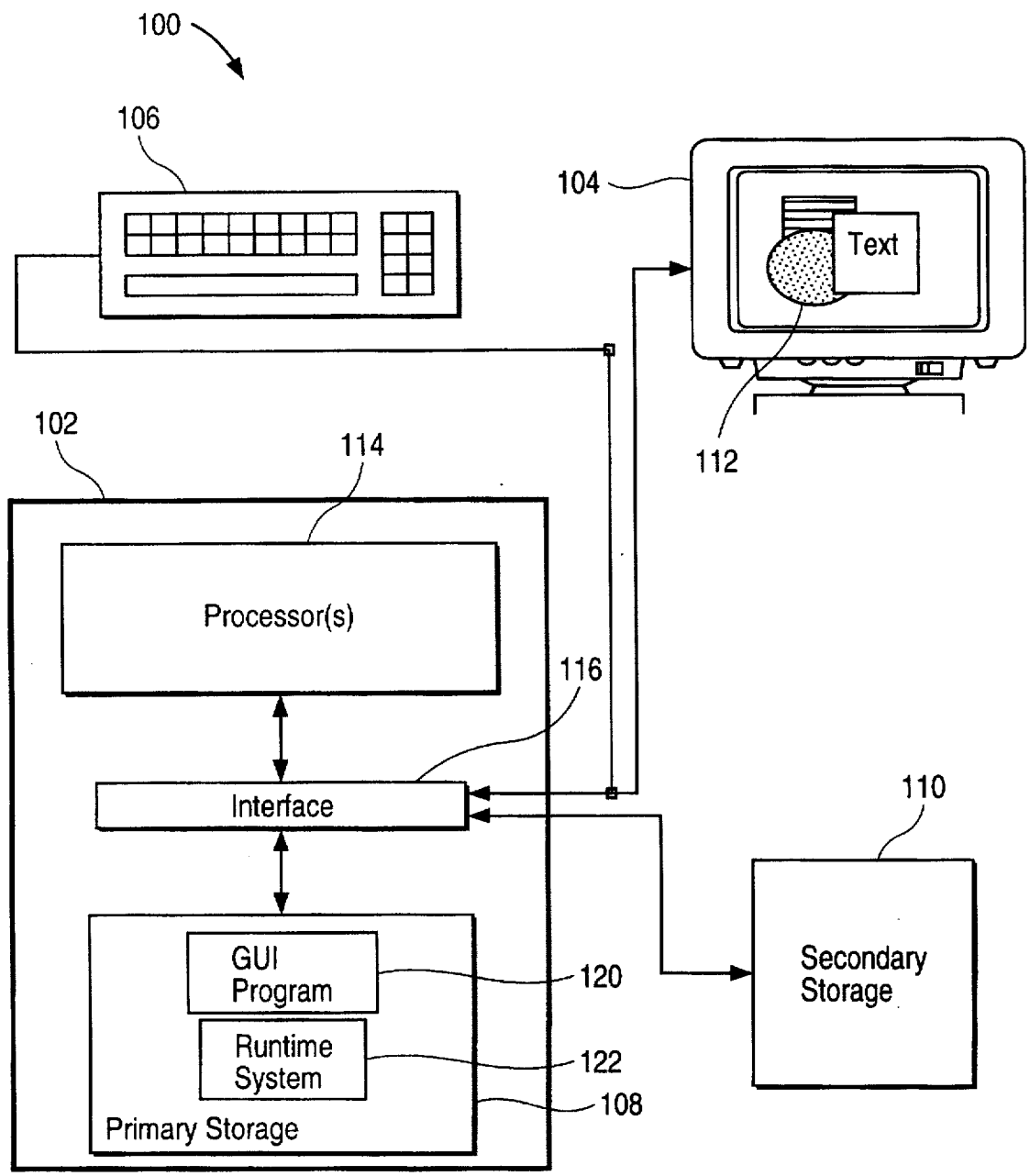
FIG. 1 is a block diagram of a computer system for practicing various embodiments of the present invention.

FIG. 1 is a block diagram of a computer system 100 for practicing various embodiments of the present invention. Typically, a computer system 100 includes a computer 102, a display device 104, an input device 106 such as a keyboard, a primary storage device 108 and a secondary storage device 110. The display device 104 displays a graphical user interface (GUI) 112 for facilitating the display of graphics and text for the user using the system 100. Display devices 104 include, for example, printers and computer display screens such as cathode ray tubes (CRT's), light-emitting diode (LED) displays, and liquid crystal displays (LCD's). Input devices 106 can include, without limitation, electronic keyboards and pointing devices such as electronic mice, trackballs, lightpens, thumbwheels, digitizing tablets, and touch sensitive pads.

The computer 102 includes one or more processors 114 which fetch computer instructions from a primary storage 108 through an interface 116, such as an input/output subsystem. Computer 102 can be, but is not limited to, any of the SPARCstation or Ultra workstation computer systems available from Sun Microsystems, Inc. of Mountain View, Calif., any of the Macintosh computer systems based on the PowerPC processor and available from Apple Computer, Inc. of Cupertino, California, or any computer system compatible with the IBM PC computer systems available from International Business Machines, Corp of Armonk, N.Y., which are based upon the X86 series of processors available from the Intel Corporation or compatible processors. Sun, Sun Microsystems, the Sun Logo, Java, HotJava, Open Windows, and NeWs are trademarks or registered trademarks of Sun Microsystems Inc. in the United States and other countries. Products bearing the SPARC or Ultra trademarks are based upon an architecture developed by Sun Microsystems, Inc. Processor 114 executes these fetched computer instructions. The processor 114 can be, but is not limited to, any of the SPARC processors available from Sun Microsystems, Inc. of Mountain View, Calif. or any processors compatible therewith. Executing these computer instructions enables the processor 114 to retrieve data or write data to the primary storage 108, display information on one or more computer display devices 104, receive command signals from one or more input devices 106, or transfer data to secondary storage 110 or other computers which collectively form a computer network (not shown). Those skilled in the art understand that primary storage 108 and secondary storage 110 can include any type of computer storage including, without limitation, randomly accessible memory (RAM), read-only-memory (ROM), application specific integrated circuits (ASIC) and storage devices which include magnetic and optical storage media such as CD-ROM.

The primary storage 108 stores a number of items including a GUI program 120 and a runtime environment 122. The runtime environment 122 typically is an operating system which manages computer resources, such as memory, disk or processor time, required for embodiments of the present invention to run. The runtime environment 122 may also be a microkernel, a message passing system, a dynamic loadable linkable module, a browser application for the World Wide Web, a runtime interpreter environment, or any other system which manages computer resources.

Detailed Description Of One Embodiment

Figure 2:
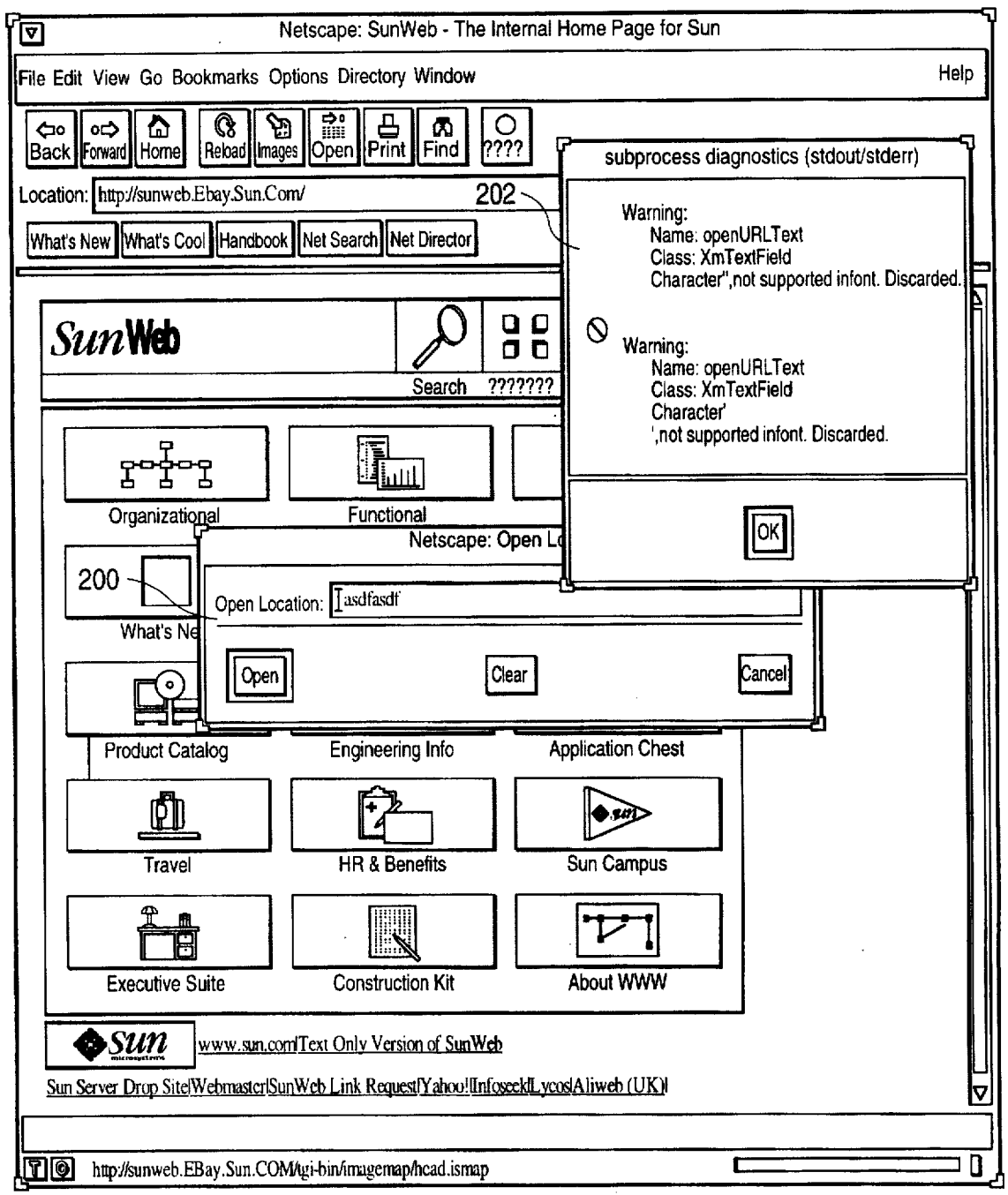
FIG. 2 illustrates a conventional error message on a graphical user interface (GUI) system.

FIG. 2 illustrates the conventional method of providing feedback information on a graphical user interface (GUI) system. Initially, a graphical processing element on the GUI receives a user defined input value and determines if the value is valid. A graphical processing element is any element within the GUI capable of receiving input values, verifying the input values, performing one or more predetermined functions on the values, or any combination thereof of these operations. If the input value is valid, the graphical processing element processes the input values. However, if the value is determined invalid, a conventional system displays a dialog box which only contains feedback information. Generally, the feedback information contained within the dialog box is an error message which does not indicate how the problem can be resolved. Moreover, the dialog box often covers up information in the graphical processing element and makes it more difficult for the user to correct the invalid input values.

For example, a first graphical processing element 200 is designed to receive a location address on the World Wide Web. First, graphical processing element 200 receives an invalid location address "asclfasdf". The invalid location address causes a dialog box 202 to "pop up" within the GUI. The dialog box 202 is an ineffective error message because it does not provide a method for solving the problem created by entering an invalid location address. Moreover, the dialog box covers a portion of the first graphic processing element 202. This makes the GUI more difficult to use because the user is forced to switch contexts to correct the invalid entry. Essentially, the user must move dialog box 202 away from graphical processing element 200 to enter a new value for the location address.

GUIs using embodiments of the present invention are easier to use because the user can correct errors in the same area in which the error is displayed. FIGS. 3–7 illustrate one method for practicing the present invention. The flow diagrams described herein broadly illustrate the logical flow of steps to perform one embodiment of the present invention. Accordingly, numerous steps may be added to, or taken away from the flow diagrams, without departing from the scope of the invention. Furthermore, the order of execution of the steps in the flow diagrams may be changed without departing from the scope of the invention. Additional considerations in implementing the method described by the flow diagrams may also dictate changes in the selection and order of the steps.

Figure 3:
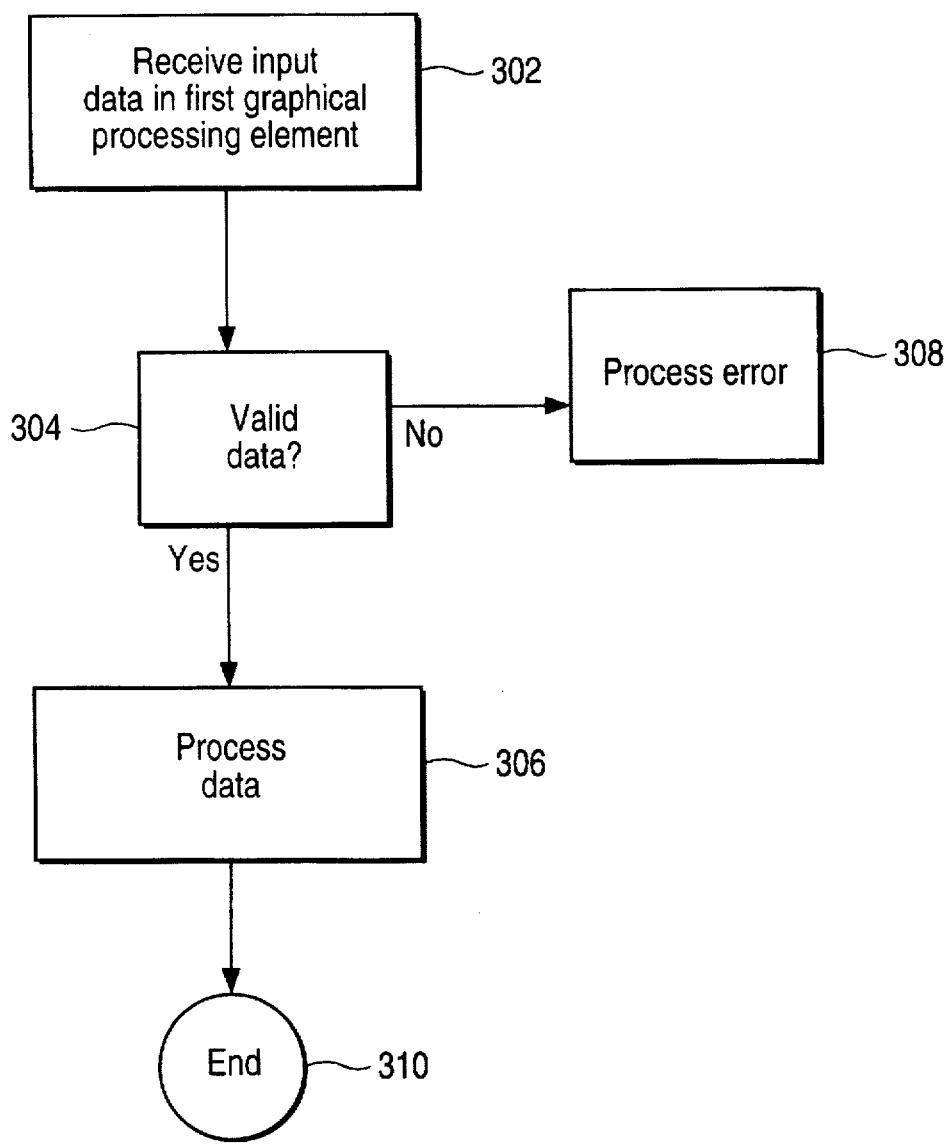
FIG. 3 illustrates the general steps for processing data on a graphical user interface (GUI) using one embodiment of the present invention.

FIG. 3 illustrates the general steps for processing data on a graphical user interface (GUI) using one embodiment of the present invention. At step 302, a first graphical processing element receives input data from the user of the GUI. As previously mentioned, a graphical processing element is any element within the GUI capable of receiving input values, verifying the input values, performing one or more predetermined functions on the values, or any combination thereof of these operations. The first graphical processing element is typically generated using graphic display primitives in Java™, OpenWindows™, NeWs™, or any windowing system or language capable of supporting GUIs. At step 304, the first graphical processing element determines if the input data received is valid. Data validation generally involves comparing the user defined input value with a set of valid input values appropriate for the particular graphical processing element displayed on the display unit. If the data is determined valid, step 306 processes the data and the process completes at step 310. However, if the data is invalid, then step 308 invokes the ShowError routine to correct the problem and process the data. The ShowError routine is designed according to one embodiment of the present invention and is described in detail below.

Figure 4:
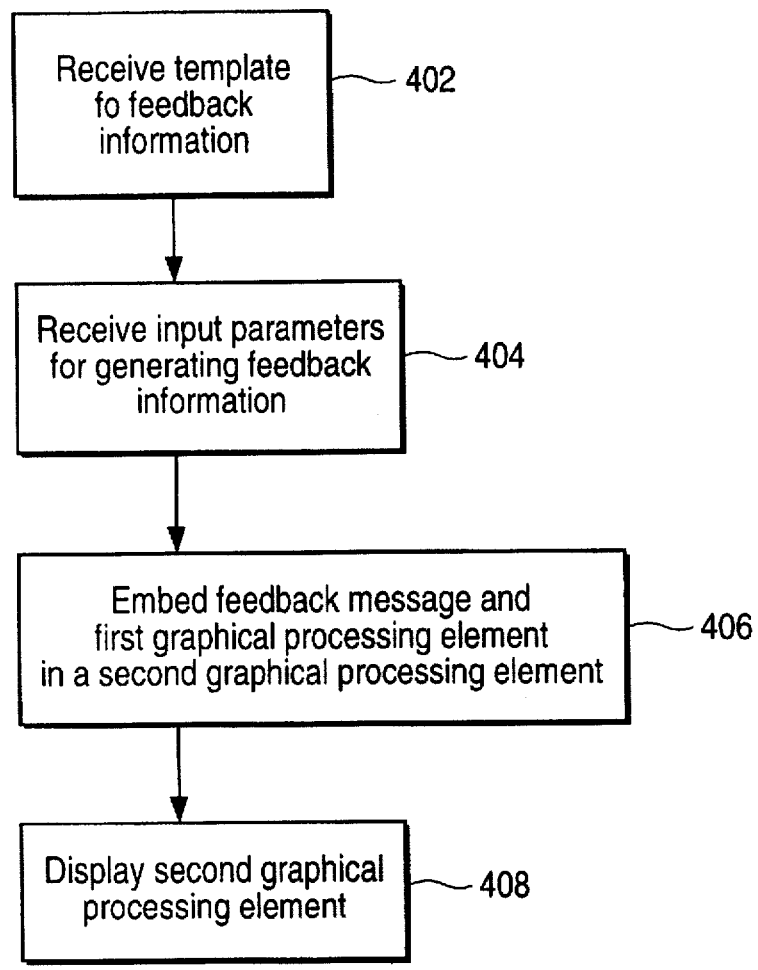
FIG. 4 illustrates the steps used in providing an error message using one embodiment of the present invention.

FIG. 4 illustrates the steps used in providing an error message using one embodiment of the present invention. At step 402, the ShowError routine receives a feedback message template which provides an outline for displaying the feedback information. Typically, the feedback information template is in a document description language for laying out text and data such as HyperText Markup Language (HTML). HTML is typically used to describe "web" pages located on the Internet which make up the World Wide Web. HTML can also be used to define the web pages located on the various "intranets" defined by the collection of private local and wide area networks.

At step 404, the first graphical processing element provides input parameters to the ShowError routine including the name of the first graphical processing element and a feedback message. The ShowError routine receives the input parameters and embeds the first graphical processing element and the feedback message within a second graphical processing element (step 406). At step 408, the ShowError routine displays the second graphical processing element which includes the feedback message in combination with the first graphical processing element. The first graphical processing element continues processing at step 302 in FIG. 3. In this particular embodiment, the first graphical processing element receives another user defined input and continues processing the input data. In one embodiment, steps 302–308 are performed in the above described manner until valid data is provided and the data process is completed at step 310.

One embodiment of the present invention can be implemented using an object oriented computer language, such as Java, in combination with a general document description language, such as HTML. The Java programming language is a general purpose object oriented computing environment and language which supports the development of GUI applications as well as client/server applications over local and wide area networks. In particular, Java enables a computer receiving a web page over an intranet or the Internet to launch applications capable of processing data. Typically, object oriented applications or "applets" are referenced in a web page along with the HTML entries. A Java enabled runtime environment receives the web page and retrieves the applet described within the web page. A Java enabled browser, such as the HotJava™ browser, then displays the web page and executes the Java applet referenced within the web page.

Figure 5:
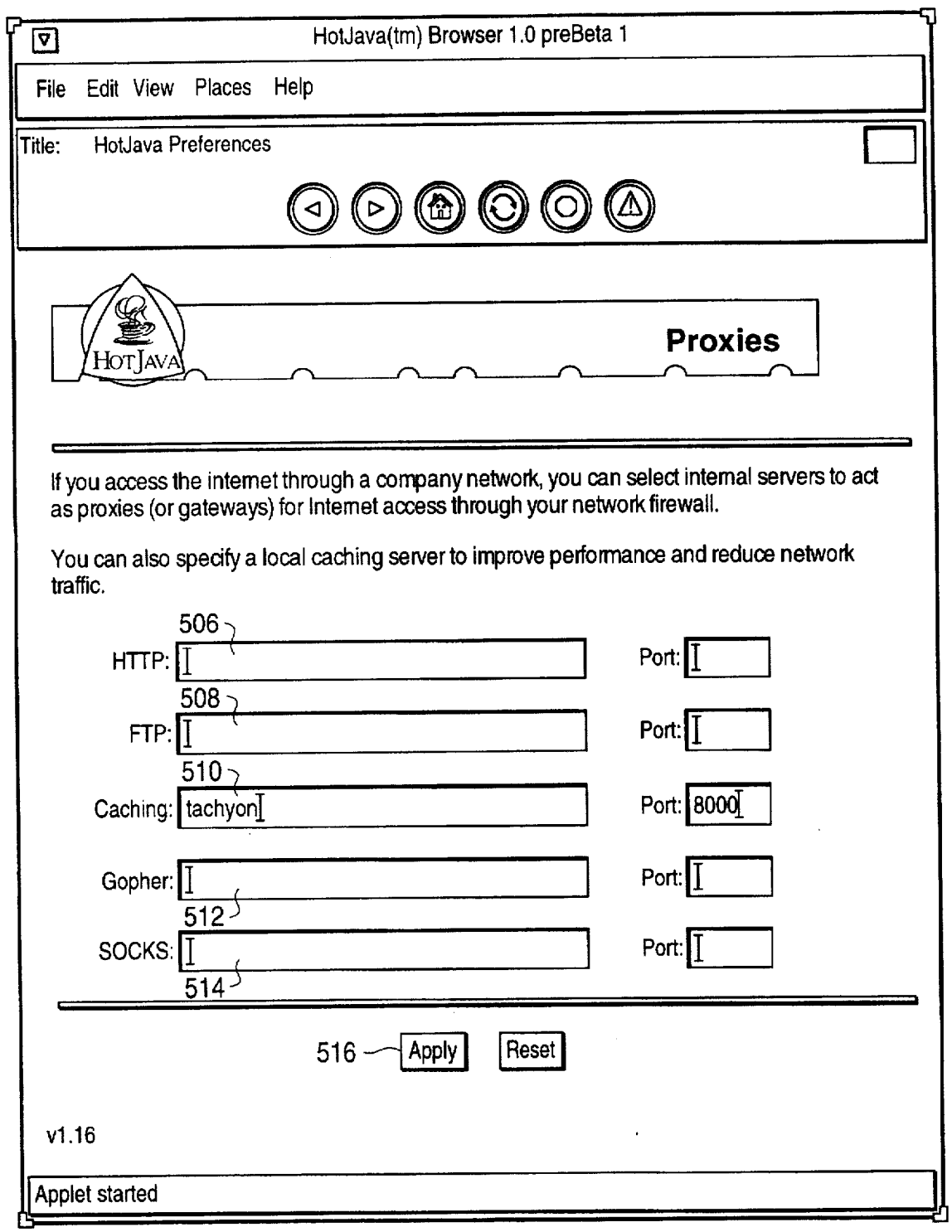
FIG. 5 illustrates a data input screen provided by one embodiment of the present invention.

FIG. 5 illustrates a web page 500 using HTML and Java to implement one embodiment of the present invention. In particular, graphical processing elements 506–514 in particular are implemented as applets written in Java. The remainder of web page 500 in FIG. 5 is implemented with a combination of HTML and Java.

Referring to FIG. 5, graphical processing elements 506–514 are implemented as five different applets: a FirewallProxyPreferences applet, a FTPProxyPreferences applet, a GopherProxyPreferences applet, a SOCKSProxyPreferences applet, and a CachingProxyPreferences applet respectively. For purposes of this embodiment, graphical processing elements 506–514 can each be a first graphical processing element. Collectively these applets enable a user to select which internal servers on the network act should act as a proxy or gateway for Internet access through the network firewall. Each applet sets a different entry in the proxy service preferences table within the HotJava browser to a specific server name and port number.

Figure 6:
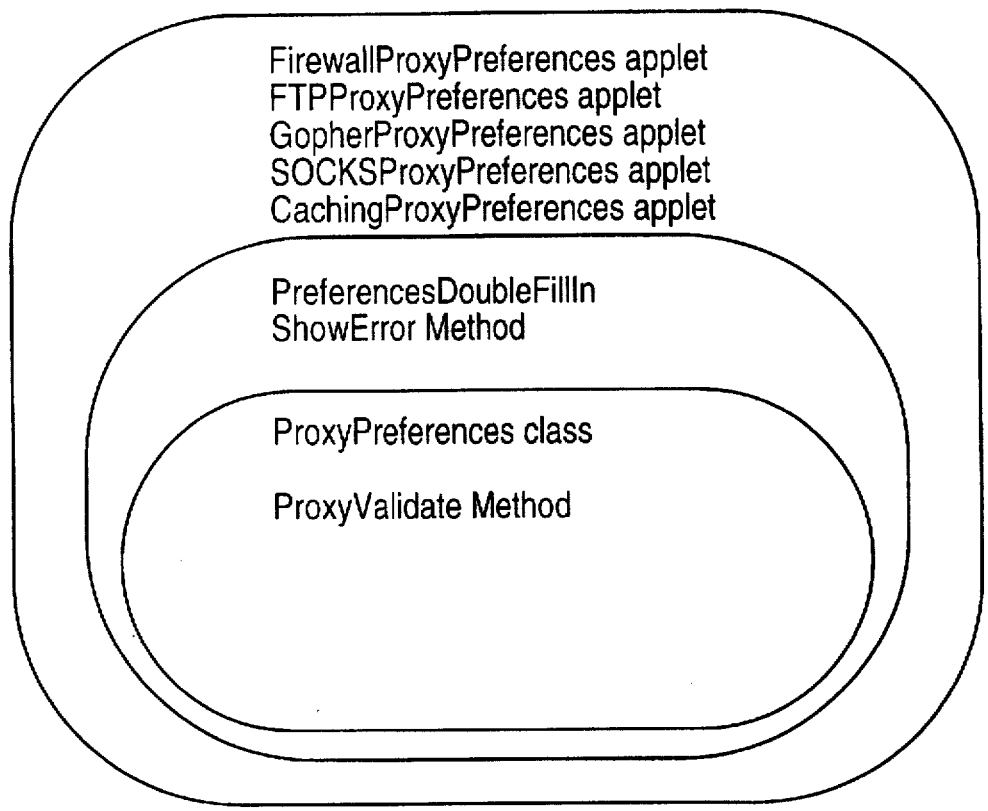
FIG. 6 is a diagram indicating the class definitions and the methods used by one embodiment of the present invention.

In accordance with object oriented programming techniques well known in the art, each of these five applets inherit methods provided by their parent classes. FIG. 6 is a diagram indicating the class definitions and the methods used by one embodiment of the present invention. A ProxyPreferences class is the first parent class to the five subclassed applets. This class enables each of the five subclassed applets to validate a server name and a port number using a ProxyValidate method. The PreferencesDoubleFillIn class is the second parent class to the five subclassed applets. The PreferencesDoubleFillIn class methods are inherited by the ProxyPreferences subclass and the five underlying subclassed applets. The PreferencesDoubleFillIn class enables the applets to display an input field capable of receiving two input values and setting specific variables to these two input values. More importantly, the PreferencesDoubleFillin class provides the ShowError method which implements one embodiment of the present invention.

The ShowError method receives the applet name, which in some embodiments is known as the name of a first graphical processing element, and a specific error message from the ProxyValidate method. In one embodiment, the specific error message is context sensitive and helps the user understand why an error has occurred. The ShowError method embeds the error message and the applet name in an HTML information feedback template. Executing this modified HTML information feedback template displays the specific error message and the applet named by the ShowError method. The combination of the applet and the specific error message is a second graphical processing element in some embodiments of the invention. The user modifies the invalid values directly in the applet displayed in the second graphical processing element. In one embodiment, the input fields in the applet are blank and contain no values. In an alternative embodiment, the invalid input value originally provided is displayed in the applet displayed in the second graphical processing element.

In operation, a user brings up the web page illustrated in FIG. 5 using the HotJava browser. The browser executes a FirewallProxyPreferences applet, a FTPProxyPreferences applet, a GopherProxyPreferences applet, a SOCKSProxyPreferences applet, and a CachingProxyPreferences applet to provide graphical processing elements 504-514. The CachingProxyPreferences applet receives the invalid server name "tachyon" and the invalid port number "8000" in each of its respective two fields. Selecting an apply button 516 causes the CachingProxyPreferences applet to invoke the ProxyValidate method to determine whether the server name and port number are valid. The CachingProxyPreferences applet passes the name of the first graphical processing element, the "CachingProxyPreferences" applet, to the ProxyValidate method in the event the input values are invalid. Since the "tachyon" server name is invalid, ProxyValidate will invoke the ShowError method which contains one embodiment of the present invention. In this case, the ProxyValidate method will pass the error string "The name you supplied for the Caching Proxy host is not valid" and the name of the first graphical processing element, the "CachingProxyPreferences" applet, as input parameters to the "ShowError" method. The "ShowError" method receives these parameters and embeds them into the appropriate portions of an HTML information feedback designed for error messages.

Figure 7:
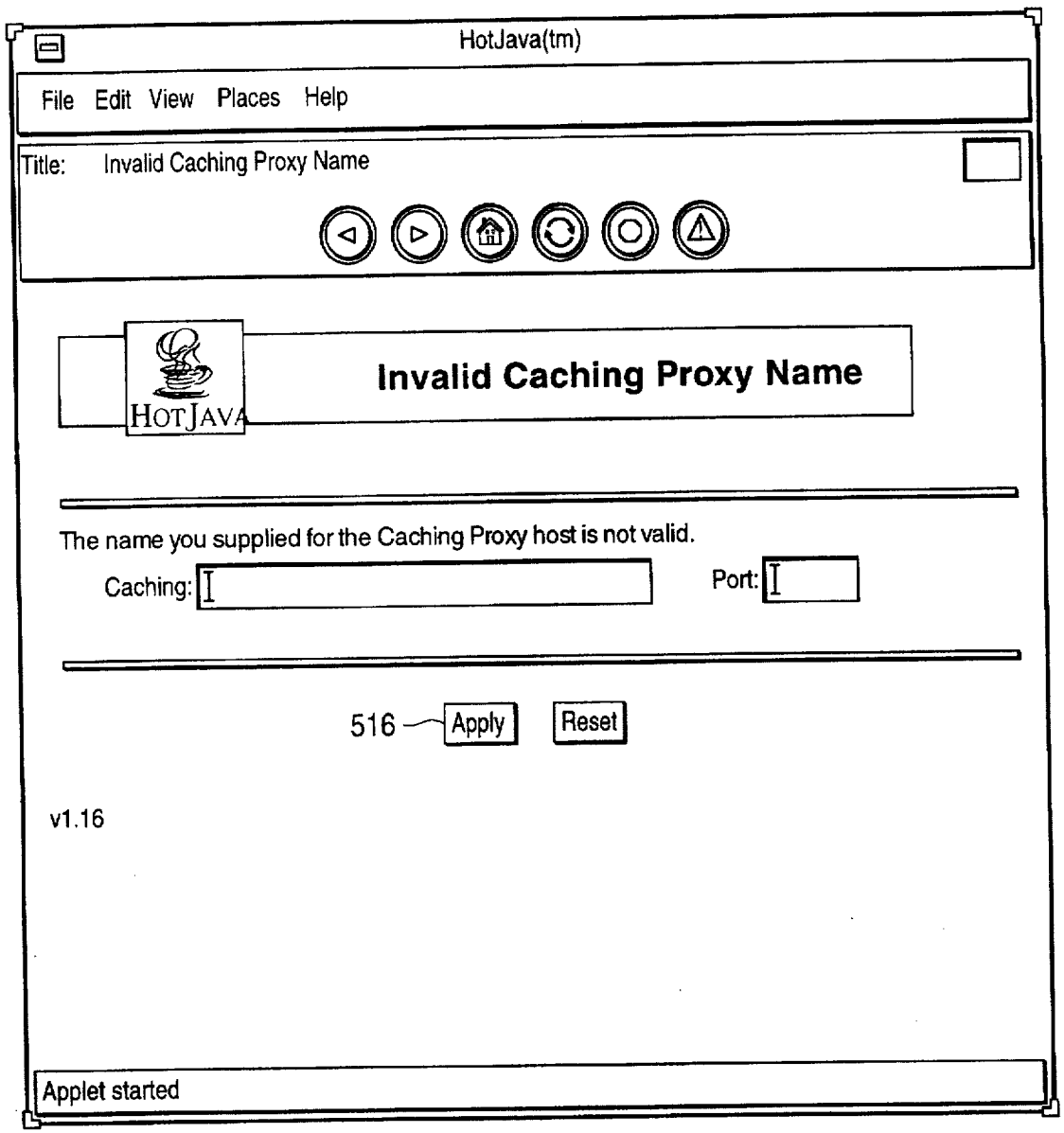
FIG. 7 illustrates an error message provided by one embodiment of the present invention.

Referring to FIG. 7, the ShowError method displays a second graphical processing element which provides the error message "The name you supplied for the Caching Proxy host is not valid" and allows the user to enter a new caching proxy host name. Notably, the "Caching" and "Port" input fields in the second graphical processing element are generated by the same applet provided in the first graphical processing element. If the new caching proxy host name is valid, the applet embedded in the second graphical processing element updates the caching proxy host table within the HotJava browser. As a result, the first graphical processing element receives control and resumes processing data.

There are several advantages offered by embodiments of the present invention which were previously unavailable. First, GUI based feedback messages provided according to principles of the present invention are easy to use because the feedback information is collocated with the mechanism for responding to the feedback. Accordingly, an error message provided according to embodiments of the present invention also include a mechanism for correcting the error. On conventional GUIs, the feedback information required to correct an error is usually severed from the area where the new data is re-entered. Existing systems force the user to switch context between the area where the error message appears and the data processing area where the data is re-entered and corrected. Context switching confuses the user and increases the time to process data. In contrast, the error messages provided according to teachings and suggestions of the present invention indicate in a single area what aspect of the data is in error and a novel technique for correcting the error.

Embodiments of the present invention are advantageous because the error messages correspond to specific errors which occur during data processing. In the past, a single error message was used to cover a broad spectrum of errors. Embodiments of the present invention, however, accept error messages tailored to the specific error or problem encountered. This reduces the ambiguity associated with various errors and makes the GUI easier to use.

Embodiments of the present invention are also advantageous because they provide a guideline for resolving the error. On existing systems, error messages indicate an error has occurred but do not indicate how the error can be resolved. Sometimes, the user must also refer to a manual or reference guide for a solution. In contrast, embodiments of the present invention provide a graphical element on the GUI which provides an error message, receives a new user defined input value, and processes the input value for the underlying application. These steps expedite the processing of data.

Embodiments of the present invention also promote rapid development of information feedback systems in software applications. In the past, a new set of error messages required a separate error message routine for displaying the error messages on the GUI. Typically, software developers could not reuse conventional error message routines without significant modifications to the code. In contrast, embodiments of the present invention reuse a generic error message routine to display all error messages on the screen.

While specific embodiments have been described herein for purposes of illustration, various modifications may be made without departing from the spirit and scope of the invention. Various embodiments of the present invention can be implemented in numerous programming languages and environments. Languages such as C++, Java, SmallTalk, and Eiffel could be used to implement these various embodiments in an object oriented environment. Numerous classes could be defined in these object oriented languages to implement embodiments of the present invention and the example provided above only provides one possible implementation. Many other class hierarchies could be defined which utilize one or more embodiments of the present invention. Languages such as C, Fortran, Cobol, and Pascal could also be used to implement these various embodiments using procedural programming techniques. Object oriented programming is one possible way to implement the invention.

Accordingly, the invention is not limited to the above described embodiments but should be interpreted according to the claims and the scope of their equivalents.

What is claimed is:

1. A computer implemented method for processing user defined input on a graphical user interface (GUI) comprising the steps of:

receiving a first user defined input value in a first graphical processing element;

determining within said first graphical processing element if said first user defined input value is a valid input;

embedding said first graphical processing element and a feedback message in a second graphical processing element when said first user defined input value is determined to be an invalid input value; and displaying said second graphical processing element.

2. The method in claim 1 further comprising the steps of:

receiving a second user defined input value in said first graphical processing element embedded in said second graphical processing element; and processing said second user defined input value using said first graphical processing element embedded in said second graphical processing element.

3. The method in claim 2 wherein said first graphical processing element is an object.

4. The method in claim 3 wherein said second graphical processing element is an object which reuses the first graphical processing element object.

5. The method in claim 2 wherein said second graphical processing element receives one or more parameters from said first graphical processing element which includes a location of said first graphical processing element and said feedback message.

6. The method in claim 1 wherein said first and second graphical processing elements are applets.

7. The method in claim 1 wherein said feedback message is an error message.

8. The method in claim 1 wherein said first graphical processing element receives input values on a Web page and processes the input values.

9. An apparatus for processing user defined input on a graphical user interface (GUI) comprising:

a receiver mechanism configured to receive a first user defined input value in a first graphical processing element;

a determination mechanism configured to determine within said first graphical processing element if said first user defined input value is a valid input;

an embedding mechanism configured to embed said first graphical processing element and said feedback message in said second graphical processing element; and a display mechanism configured to display said second graphical processing element and said feedback message when said first user defined input value is determined to be an invalid input value.

10. The apparatus in claim 9 further comprising:

a receiver mechanism configured to receive a second user defined input value in said first graphical processing element embedded in said second graphical processing element; and a processor mechanism configured to process said second user defined input value in said first graphical processing element embedded in said second graphical processing element.

11. A computer program product comprising:

a computer usable medium having computer readable code embodied therein for processing user defined input on a graphical user interface (GUI), the computer program product comprising:

code configured to receive a first user defined input value in a first graphical processing element;

code configured to determine within said first graphical processing element if said first user defined input value is a valid input;

code configured to embed said first graphical processing element and said feedback message in said second graphical processing element; and code configured to display a second graphical processing element which includes a feedback message when said first user defined input value is determined to be an invalid input value.

12. The computer program product in claim 11 further comprising:

code configured to receive a second user defined input value in said first graphical processing element embedded in said second graphical processing element; and code configured to process said second user defined input value in said first graphical processing element embedded in said second graphical processing element.

13. The computer program product in claim 12 wherein said first graphical processing element is an object.

14. The computer program product in claim 13 wherein said second graphical processing element is an object which reuses the first graphical processing element object.

15. The computer program product in claim 12 wherein said second graphical processing element receives one or more parameters from said first graphical processing element which includes a location of said first graphical processing element and said feedback message.

16. The computer program product in claim 11 wherein said first and second graphical processing elements are applets.

17. The computer program product in claim 11 wherein said feedback message is an error message.

18. The computer program product in claim 11 wherein said first graphical processing element receives input values on a Web page and processes the input values.

* * * * *